United States Patent [19]
Yuska

[11] 3,808,532
[45] Apr. 30, 1974

[54] EXTENDER TEST CONNECTOR FOR PLUG-IN MODULE

[75] Inventor: Leonard J. Yuska, Greenwood, Ind.

[73] Assignee: The United States of America as represented by the Secretary of the Navy, Washington, D.C.

[22] Filed: Oct. 12, 1972

[21] Appl. No.: 297,152

[52] U.S. Cl..... 324/158 F, 317/101 DH, 324/158 P
[51] Int. Cl................................................ G01r 1/06
[58] Field of Search..................... 324/158 P, 158 F; 317/101 DH

[56] References Cited
UNITED STATES PATENTS

| | | | |
|---|---|---|---|
| 2,823,304 | 2/1958 | Shiels | 324/158 F |
| 2,951,185 | 8/1960 | Buck | 324/158 F |
| 2,841,660 | 7/1958 | Tabet | 324/158 F |
| 2,862,992 | 12/1958 | Franz | 324/158 F |
| 2,952,810 | 9/1960 | Helton | 324/158 F |
| 3,147,054 | 9/1964 | Alexander et al. | 324/158 F |

OTHER PUBLICATIONS

Korosec et al.; IBM Tech. Dis. Bull., Aug. 1972, pg. 865, 866

Primary Examiner—Alfred E. Smith
Assistant Examiner—Ernest F. Karlsen
Attorney, Agent, or Firm—R. S. Sciascia; Paul S. Collignon

[57] ABSTRACT

An extender test connector for an electronic plug-in module assembly having a first connector adaptable for electrical connection with a module mounting frame assembly and a second connector for electrical connection with a plug-in module. The first and second connectors are mechanically attached to separate ends of a terminal board having a plurality of terminals. Corresponding pins on the first and second connectors are electrically connected through one of said terminals which serves as a test point.

2 Claims, 5 Drawing Figures

PATENTED APR 30 1974 3,808,532

EXTENDER TEST CONNECTOR FOR PLUG-IN MODULE

BACKGROUND OF THE INVENTION

The present invention relates to a test connector assembly for testing electronic plug-in modules while the modules are connected to a rack or chassis.

There is a constant demand for smaller electrical and electronic components, particularly in the aircraft and missile fields, as weight is of extreme importance. One concept of microelectronics which has been recently developed and which offers a great reduction in size and weight of electronic units is that of integrated circuitry which is formed on insulated bases such as glass, fused silica, or ceramic substrates. Integrated circuitry includes a number of active and passive components which are fabricated by one or more of a combination of several thin film deposition techniques onto a glass or ceramic substrate.

In order to reduce costs, expedite production, and provide a reliable electronic component, the Department of the Navy, as well as other military branches, have been engaged in a standard hardware program in which electronic plug-in modules have been developed which are capable of meeting various system requirements. One such plug-in module is shown in U.S. Pat. No. 3,243,660, entitled "Electronic Module Assembly," which issued Mar. 29, 1966, to Leonard J. Yuska and David P. Zimmerman.

One concept of a standard hardware program is to have a plurality of modules which plug in a chassis to form an assembly and normally these plug-in modules slide in grooves or ways in the chassis and engage a mating female connector. These modules are closely assembled and heretofore there has not been any way to test the modules while they are positioned in their chassis. As a malfunction can occur in either the plug-in module or the connector in the chassis, it is frequently desirable to be able to test voltages, resistances, and the like, while the plug-in module is in place.

SUMMARY OF THE INVENTION

The present invention relates to an extender test connector that permits a plug-in module to be tested in the environment in which it will be operating. The plug-in module, however, is connected to the extender and the extender, in turn, is plugged into the female connector in a chassis. The extender is comprised of first and second connectors which are attached to separated end of a terminal board. The terminal board is provided with a plurality of terminals and corresponding pins on the two connectors are electrically connected together through one of the terminals. The terminals serve as convenient test points that can be used while the plug-in module is energized.

DESCRIPTION OF THE PREFERRED EMBODIMENT

Figure 1:
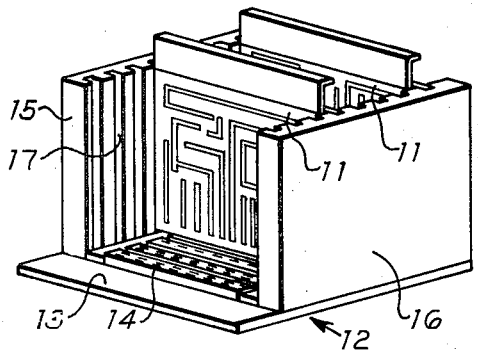
FIG. 1 is a perspective view of a module assembly having some of the plug-in modules removed.

Referring first to FIG. 1 of the drawing there is shown, for purposes of illustration, two plug-in modules 11 in a rack or chassis 12. Chassis 12 is shown comprised of a base plate 13 to which a plurality of female connectors 14 are attached. Sides 15 and 16 are attached to base plate 13 and slots 17 are provided in sides 15 and 16 for slidably receiving and supporting plug-in modules 11 which are provided with a male connector which mate with connectors 14. It can be readily understood that when chassis 12 is filled with plug-in modules 11, checking or testing of modules 11 is most difficult, if not impossible, due to the compact arrangement of the assembly. In case of a malfunction of a module 11, it is desirable to be able to test the module 11 while plugged into its mating connector, as the trouble can be either in the module 11 or the chassis 12.

Referring now to FIGS. 2 through 5 of the drawing, there is shown an extender 21 that has a male connector 22 and a female connector 23 which are connected to opposite ends of a terminal board 24. Male connector 22 which, for purpose of illustration, has forty electrical contact pins 25, is selected to mate with a female connector 14 in chassis 12. Female connector 23 is adaptable for receiving a male connector of a plug-in module 11 and is identical to connector 14 in chassis 12. Metal side rails 26 and 27 are provided and are slotted so that the sides of terminal board 24 fit therein to provide added strength to terminal board 24.

Figure 5:
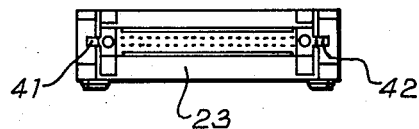
FIG. 5 is a top view of the preferred embodiment shown in FIG. 1 of the drawing.
Figures 2, 3, 4:
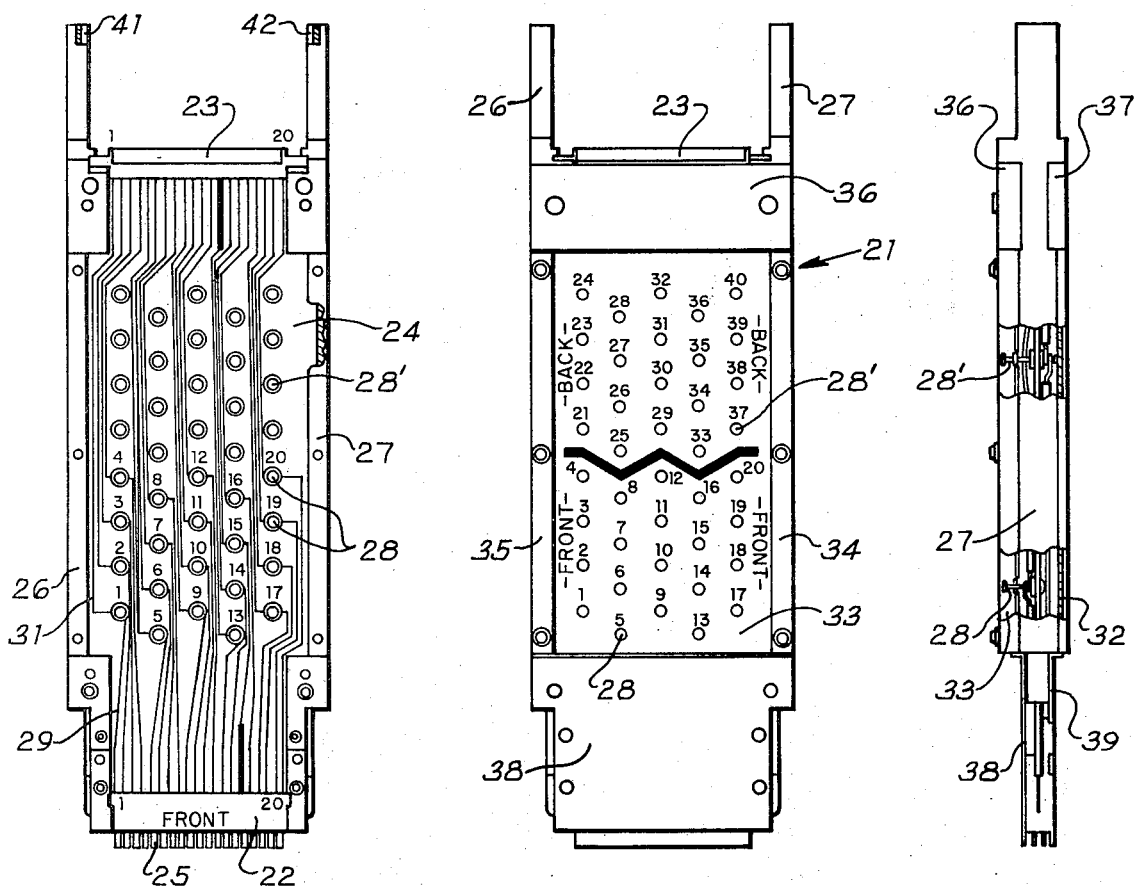
FIG. 2 is a front view of a preferred embodiment of the present invention.
FIG. 3 is a front view similar to FIG. 1 of the drawing having panels removed to show wiring connections.
FIG. 4 is a side view of the preferred embodiment shown in FIG. 1 of the drawing.

Terminal board 24 is provided with terminals 28 equal in number to the number of connector pins in connector 22. As best shown in FIG. 3 of the drawing, each connector pin of connector 22 is connected by a lead 29 to a separate terminal 28 and the terminal 28, in turn, is connected by a lead 31 to a corresponding connector pin in connector 23. For example, a lead 29 is connected between connector pin "1" of connector 22 and the terminal pin 28 which is indicated as "1." Lead 31, in turn, connects terminal pin mark "1" and connector pin "1" of connector 23. As best shown in FIG. 4 of the drawing, terminals 28 which are connected to connector pins numbered "1" through "20" are single ended terminals and terminals 28' which are connected to connector pins numbered "21" through "40" are double ended or feedthru terminals. These feedthru terminals 28' permit one-half of leads 29 and 31 to be placed on the backside of terminal board 24 and thus there is more room for placing leads 29 and 31. A back cover 32 is provided to protect feedthru terminals 28' and leads 29 and 30 and, likewise, a front cover 33 is provided to protect leads 29 and 30. As shown in FIG. 2 of the drawing, front cover 33 is retained in position by metal strips 34 and 35 and front cover 33 is provided with a plurality of holes through which terminals 28 pass. As connectors 22 and 23 have their connector pins arranged in two rows, pins numbered "1" through "20" are designated the front row and pins numbered "21" through "40" are designated the back row. Indicia is placed on front cover 33 to indicate which terminals 28 connect with the various connector pins. Plates 36 and 37 are attached to side rails 26 and 27 and provide additional strength to the assembly and also serve as covers for the ends of leads 31. Plates 38 and 39 are provided to cover leads 29 which have one end connected to the connector pins of connector 22. As best shown in FIGS. 3 and 5 of the drawing, the edges of terminal board 24 are fitted in slots 41 and 42 in side rails 26 and 27, respectively, and slots 41 and 42 extend to the ends of rails 26 and 27 and receive and retain a module 11 which is plugged into connector 23.

When it is desired to test a particular module 11 in chassis 12, the module 11 is removed from its connector 14 and extender 21 is plugged into chassis 12 with connector 22 being inserted into the connector vacated by module 11. Module 11 is then fitted into slots 41 and 42 in side rails 26 and 27 and the connector on module 11 is engaged with connector 23. Module 11 can then be energized and any desired electrical readings can be obtained by contacting terminals 28.

It can thus be seen that the present invention provides a convenient means for testing a plug-in module while it is connected with the circuitry with which it will operate.

I claim:

1. A connector extender assembly for testing an electronic module assembly comprising,
  a terminal board,
  a male electrical connector having a plurality of connector pins, said male electrical connector being attached to one end of said terminal board,
  a female electrical connector having a plurality of connector pins, said female electrical connector being attached to the opposite end to which said male electrical connector is attached,
  a plurality of electrical terminals at least equal in number to the number of connector pins in said male connector, said terminals being aligned in a plurality of columns and attached perpendicular to said terminal board, and
  a plurality of circuit means connected one each between corresponding connector pins in said male and female electrical connectors through one each of said terminals whereby said terminals serve as test points for testing an electronic module assembly plugged into said female electrical connector, wherein one-half of said electrical terminals are single ended terminals extending on one side of said terminal board and one-half of said electrical terminals are double ended terminals extending on both sides of said terminal board and wherein one-half of said circuit means are connected through said single ended terminals and one-half of said circuit means are connected through said double ended terminals on the side opposite to the side from which said single ended terminals extend.

2. A connector extender assembly as set forth in claim 1 having means attached to said terminal board for slidably attaching an electronic module assembly to be tested.

* * * * *